US011757330B2

(12) United States Patent
Jefferies et al.

(10) Patent No.: US 11,757,330 B2
(45) Date of Patent: Sep. 12, 2023

(54) CANNED OUTER-ROTOR BRUSHLESS MOTOR FOR A POWER TOOL

(71) Applicant: Black & Decker Inc., New Britain, CT (US)

(72) Inventors: Dustin Jefferies, Baltimore, MD (US); Marcus E. E. Rydin, Towson, MD (US); Jarrett A. Dunston, Bel Air, MD (US); Timothy W. French, Hampstead, MD (US); Gale A. Heslop, Carney, MD (US); Ross A. Billings, Reisterstown, MD (US)

(73) Assignee: BLACK & DECKER, INC., New Britain, CT (US)

( * ) Notice: Subject to any disclaimer, the term of this patent is extended or adjusted under 35 U.S.C. 154(b) by 122 days.

(21) Appl. No.: 17/125,031

(22) Filed: Dec. 17, 2020

(65) Prior Publication Data
US 2021/0194321 A1 Jun. 24, 2021

Related U.S. Application Data
(60) Provisional application No. 62/950,562, filed on Dec. 19, 2019.

(51) Int. Cl.
H02K 7/14 (2006.01)
H02K 1/16 (2006.01)
(Continued)

(52) U.S. Cl.
CPC ............... *H02K 7/145* (2013.01); *H02K 1/16* (2013.01); *H02K 1/2791* (2022.01); *H02K 5/1735* (2013.01)

(58) Field of Classification Search
CPC ........ H02K 7/145; H02K 1/16; H02K 1/2786; H02K 5/1735
(Continued)

(56) References Cited

U.S. PATENT DOCUMENTS 4,133,230 A 1/1979 Inaba et al.
4,259,603 A 3/1981 Uchiyama et al.
(Continued)

FOREIGN PATENT DOCUMENTS

CA 2828567 C 3/2017
CN 202696436 U * 1/2013
(Continued)

OTHER PUBLICATIONS

EP EESR dated, Mar. 5, 2021 in corresponding EP application No. 202115703.8.
(Continued)

Primary Examiner — Jose A Gonzalez Quinones

(57) ABSTRACT

An outer-rotor brushless direct-current (BLDC) motor is provided including a rotor shaft, a motor housing having an open end and a closed end that supports a first motor bearing, a stator core having an aperture extending therethrough, a stator mount coupled to the open end and including an elongated cylindrical member projecting into the aperture of the stator core and a radial wall that supports a second motor bearing, an outer rotor, and a rotor mount including an outer rim arranged to couple to the outer rotor and an inner body mounted on the rotor shaft. An intermediate bearing is received at least partially within the aperture of the stator core to radially support the stator core relative to the rotor shaft.

13 Claims, 12 Drawing Sheets

(51) Int. Cl.
*H02K 5/173* (2006.01)
*H02K 1/2791* (2022.01)

(58) Field of Classification Search
USPC .......................................................... 310/50
See application file for complete search history.

(56) References Cited

U.S. PATENT DOCUMENTS

| | | |
|---|---|---|
| 4,540,906 A | 9/1985 | Blom |
| 4,867,581 A | 9/1989 | Schmidt et al. |
| 4,885,496 A | 12/1989 | Wheeler |
| 5,099,164 A | 3/1992 | Wheeler |
| 5,144,183 A | 9/1992 | Farrenkopf |
| 5,182,848 A | 2/1993 | Wheeler |
| 5,241,229 A | 8/1993 | Katakura et al. |
| 5,245,234 A | 9/1993 | Okada et al. |
| 5,394,283 A | 2/1995 | Hans et al. |
| 5,497,040 A | 3/1996 | Sato |
| 5,591,017 A | 1/1997 | Dwyer |
| 5,654,598 A | 8/1997 | Horski |
| 5,844,338 A | 12/1998 | Horski |
| 5,898,988 A | 5/1999 | Horski |
| 5,994,803 A | 11/1999 | Jung |
| 6,069,766 A | 5/2000 | Battu et al. |
| 6,170,275 B1 | 1/2001 | Ueno et al. |
| 6,282,053 B1 | 8/2001 | MacLeod et al. |
| 6,300,695 B1 | 10/2001 | Neal |
| 6,362,554 B1 | 3/2002 | Neal |
| 6,437,464 B1 | 8/2002 | Neal |
| 6,501,616 B1 | 12/2002 | Neal |
| 6,617,747 B1 | 9/2003 | Petersen |
| 6,707,224 B1 | 3/2004 | Petersen |
| 6,798,111 B1 | 9/2004 | Petersen |
| 6,836,041 B2 | 12/2004 | Chou et al. |
| 6,853,102 B2 | 2/2005 | Itaya et al. |
| 6,992,419 B2 | 1/2006 | Kim et al. |
| 7,064,462 B2 | 6/2006 | Hempe et al. |
| 7,109,623 B2 | 9/2006 | Wada et al. |
| 7,122,923 B2 | 10/2006 | Lafontaine et al. |
| 7,166,948 B2 | 1/2007 | Petersen |
| 7,202,620 B2 | 4/2007 | Petersen |
| 7,356,906 B2 | 4/2008 | Kim et al. |
| 7,439,642 B2 | 10/2008 | Chen et al. |
| 7,443,074 B2 | 10/2008 | Kim et al. |
| 7,521,826 B2 | 4/2009 | Hempe et al. |
| 7,598,634 B2 | 10/2009 | Izumi |
| 7,652,406 B2 | 1/2010 | Kim et al. |
| 7,659,644 B2 | 2/2010 | Fukuno et al. |
| 7,671,884 B2 | 3/2010 | Itami et al. |
| 7,687,959 B1 | 3/2010 | Lee |
| 7,768,166 B2 | 8/2010 | Lafontaine et al. |
| 7,800,267 B2 | 9/2010 | Sahara et al. |
| 7,859,155 B2 | 12/2010 | Sahara et al. |
| 8,016,574 B2 | 9/2011 | De Filippis et al. |
| 8,132,702 B2 | 3/2012 | Kunz et al. |
| 8,133,143 B2 | 3/2012 | Schoon |
| 8,207,642 B2 | 6/2012 | Lafontaine et al. |
| 8,449,424 B2 | 5/2013 | Schoon |
| 8,461,734 B2 | 6/2013 | Sahara et al. |
| 8,573,323 B2 | 11/2013 | Müller et al. |
| 8,816,544 B2 | 8/2014 | Tanimoto et al. |
| 8,816,545 B2 | 8/2014 | Fukuoka et al. |
| 8,872,398 B2 | 10/2014 | Ota |
| 8,963,392 B2 | 2/2015 | Ziegler et al. |
| 9,132,542 B2 | 9/2015 | Lau et al. |
| 9,219,392 B2 | 12/2015 | Sahara et al. |
| 9,314,900 B2 | 4/2016 | Vanko et al. |
| 9,325,224 B2 | 4/2016 | Vander Lind et al. |
| 9,680,349 B2 | 6/2017 | Tokairin et al. |
| 9,685,840 B2 | 6/2017 | Germann et al. |
| 9,724,814 B2 | 8/2017 | Yoshikane et al. |
| 9,755,479 B2 | 9/2017 | O |
| 9,762,153 B2 | 9/2017 | Forster et al. |
| 9,782,883 B2 | 10/2017 | Fuchs et al. |
| 9,908,234 B2 | 3/2018 | Fuchs et al. |
| 9,929,627 B2 | 3/2018 | Klode et al. |
| 10,011,035 B2 | 7/2018 | Nakashima |
| 10,084,360 B2 | 9/2018 | Aoyama |
| 10,193,416 B2 | 1/2019 | Germann et al. |
| 10,193,417 B2 | 1/2019 | Fogle et al. |
| 10,312,767 B2 | 6/2019 | Nishidate |
| 10,369,672 B2 | 8/2019 | Bergquist et al. |
| 10,717,182 B2 | 7/2020 | Chen et al. |
| 2001/0013732 A1 | 8/2001 | Hsu |
| 2004/0135462 A1 | 7/2004 | Masayuki |
| 2006/0096771 A1* | 5/2006 | Brotto ................... B25B 21/00 173/217 |
| 2007/0145838 A1 | 6/2007 | Uchitani et al. |
| 2010/0026126 A1 | 2/2010 | Han et al. |
| 2014/0191603 A1 | 7/2014 | Lim |
| 2015/0014007 A1 | 1/2015 | Ukai et al. |
| 2015/0047866 A1 | 2/2015 | Sakai et al. |
| 2015/0303753 A1 | 10/2015 | Huang et al. |
| 2016/0190881 A1 | 6/2016 | Kanatani et al. |
| 2016/0226278 A1* | 8/2016 | Wenger ................. H02J 7/0044 |
| 2017/0085140 A1 | 3/2017 | Tang et al. |
| 2017/0248145 A1 | 8/2017 | Chu et al. |
| 2017/0264177 A1 | 9/2017 | Lee et al. |
| 2017/0288494 A1 | 10/2017 | Showa et al. |
| 2017/0294819 A1* | 10/2017 | Crosby .................... H02K 5/15 |
| 2017/0331355 A1 | 11/2017 | He et al. |
| 2017/0334056 A1 | 11/2017 | Kawakami et al. |
| 2017/0366061 A1 | 12/2017 | Looi et al. |
| 2017/0373615 A1* | 12/2017 | Lewis .................... H02K 7/145 |
| 2018/0083503 A1 | 3/2018 | Beckman et al. |
| 2018/0091020 A1 | 3/2018 | Horng et al. |
| 2018/0123405 A1 | 5/2018 | Tang et al. |
| 2018/0212485 A1 | 7/2018 | Chu et al. |
| 2018/0233989 A1 | 8/2018 | Ishida |
| 2019/0059373 A1 | 2/2019 | Fogle |
| 2019/0074733 A1 | 3/2019 | Tomiyama et al. |
| 2019/0074751 A1 | 3/2019 | Chen |
| 2019/0165639 A1* | 5/2019 | Makino .................. H02K 5/225 |
| 2019/0181722 A1 | 6/2019 | Kajikawa et al. |
| 2020/0198100 A1 | 6/2020 | Schneider et al. |
| 2020/0343780 A1 | 10/2020 | Fogle et al. |
| 2021/0331299 A1 | 10/2021 | Ellice et al. |

FOREIGN PATENT DOCUMENTS

| | | | |
|---|---|---|---|
| CN | 202696436 U | | 1/2013 |
| CN | 103956846 A | | 7/2014 |
| CN | 205304559 U | * | 6/2016 |
| CN | 205304559 U | | 6/2016 |
| CN | 107834750 A | | 3/2018 |
| CN | 110535284 A | | 12/2019 |
| DE | 20307048 U1 | | 9/2003 |
| DE | 10320288 A1 | | 12/2004 |
| DE | 102005011020 A1 | | 9/2006 |
| DE | 102008058433 A1 | | 6/2009 |
| DE | 102008047494 A1 | | 4/2010 |
| DE | 102009026621 A1 | | 4/2010 |
| DE | 202011003834 U1 | | 9/2011 |
| DE | 102012102042 A1 | | 9/2012 |
| DE | 102013103813 A1 | | 10/2013 |
| DE | 102013204436 A1 | | 9/2014 |
| DE | 102014220493 A1 | | 4/2016 |
| DE | 102016109673 A1 | | 12/2016 |
| DE | 102017108652 A1 | | 11/2017 |
| DE | 102017218534 A8 | | 7/2018 |
| DE | 112017000304 T5 | | 9/2018 |
| DE | 102018118628 A1 | | 2/2020 |
| DE | 102020110320 A1 | | 10/2020 |
| DE | 102021201313 A1 | | 8/2021 |
| EP | 1273088 A2 | | 1/2003 |
| EP | 1378983 A2 | | 1/2004 |
| EP | 1450467 A1 | | 8/2004 |
| EP | 1250531 B1 | | 10/2004 |
| EP | 1580870 A2 | | 9/2005 |
| EP | 1081386 B1 | | 3/2006 |
| EP | 1696537 A1 | | 8/2006 |
| EP | 1622241 B1 | | 2/2007 |
| EP | 1026507 B1 | | 5/2007 |
| EP | 1716338 B1 | | 7/2007 |

(56) References Cited

FOREIGN PATENT DOCUMENTS

| | | |
|---|---|---|
| EP | 1816727 A2 | 8/2007 |
| EP | 1993193 A1 | 11/2008 |
| EP | 1995853 A1 | 11/2008 |
| EP | 1513244 B1 | 6/2009 |
| EP | 2278690 A1 | 1/2011 |
| EP | 2368670 A2 | 9/2011 |
| EP | 2145722 B1 | 5/2012 |
| EP | 2860857 A2 | 4/2015 |
| EP | 1816729 B1 | 10/2015 |
| EP | 2838694 B1 | 3/2016 |
| EP | 3035508 A2 | 6/2016 |
| EP | 3101784 A1 | 12/2016 |
| EP | 2090780 B1 | 5/2017 |
| EP | 2948402 B1 | 6/2017 |
| EP | 3211760 A1 | 8/2017 |
| EP | 2449653 B1 | 9/2017 |
| EP | 2251148 B1 | 11/2017 |
| EP | 3300224 A1 | 3/2018 |
| EP | 2410635 B1 | 7/2018 |
| EP | 3344416 A2 | 7/2018 |
| EP | 3429069 A1 | 1/2019 |
| EP | 3496239 A1 | 6/2019 |
| EP | 3121945 B1 | 9/2019 |
| EP | 3247026 B1 | 12/2019 |
| EP | 2173022 B1 | 5/2020 |
| EP | 3326275 B1 | 2/2021 |
| FR | 2981874 A1 * | 5/2013 ................ B25F 5/00 |
| FR | 2991210 A3 | 12/2013 |
| JP | 09209973 A | 8/1997 |
| JP | 2001-339902 A | 12/2001 |
| JP | 2002258202 A | 9/2002 |
| JP | 2002258202 A * | 9/2002 |
| JP | 2008-312356 A | 12/2008 |
| JP | 2009-100573 A | 5/2009 |
| JP | 2014-079039 A | 5/2014 |
| JP | 5700266 B2 | 4/2015 |
| JP | 2018-93710 A | 6/2018 |
| WO | 2006102609 A2 | 9/2006 |
| WO | 2007/142299 A1 | 12/2007 |
| WO | WO-2009111743 A1 * | 9/2009 ......... A61B 1/00022 |
| WO | WO-2013162122 A1 * | 10/2013 ............ A45D 20/12 |
| WO | 2015163640 A1 | 10/2015 |
| WO | 2016035358 A1 | 3/2016 |
| WO | 16088989 A1 | 6/2016 |
| WO | 16115921 A1 | 7/2016 |
| WO | 2016193044 A1 | 12/2016 |
| WO | 2017005002 A1 | 1/2017 |
| WO | 2017107315 A1 | 6/2017 |
| WO | 17144464 A1 | 8/2017 |
| WO | 2017197810 A1 | 11/2017 |
| WO | 18018905 A1 | 2/2018 |
| WO | 18054573 A1 | 3/2018 |
| WO | 18054574 A1 | 3/2018 |
| WO | 18170726 A1 | 9/2018 |
| WO | 2018207737 A1 | 11/2018 |
| WO | 2018228172 A1 | 12/2018 |
| WO | 2019199056 A1 | 10/2019 |

OTHER PUBLICATIONS

EP Communication Article 94(3) dated Mar. 10, 2023 in corresponding EP application No. 20215703.8.

* cited by examiner

CANNED OUTER-ROTOR BRUSHLESS MOTOR FOR A POWER TOOL

RELATED APPLICATION

This patent application claims the benefit of U.S. Provisional Patent Application No. 62/950,562 filed Dec. 19, 2019, content of which is incorporated herein by reference in its entirety.

FIELD

This disclosure relates to a brushless motor assembly for a rotary tool, and particularly to an outer-rotor motor assembly having a modular design.

BACKGROUND

A brushless direct-current (BLDC) motor typically includes a stator that is electronically commuted through various phases and a permanent magnet rotor that is rotatably driven relative to the stator as the phases of the stator are sequentially energized. The stator is commonly provided as a cylindrical core with a hollow center that receives the rotor therein. The rotor is mounted on a rotor shaft.

In some power tool applications, an outer-rotor BLDC motor is provided. Outer-rotor BLDC motors are typically capable of building more inertia in the rotor shaft due to the greater mass of the rotor and are more suitable for certain power tool applications. US Publication No. 2019/0058373, which is incorporated herein by reference, provides an example of a nailer that is provided with an outer-rotor BLDC motor, where a flywheel is integrally mounted on the outer surface of the rotor.

What is needed is a compact outer rotor motor having a high power density suitable for portable power tool applications.

SUMMARY

According to another embodiment, a BLDC motor is provided including a rotor shaft on which a rear motor bearing and a front motor bearing are mounted, and a motor housing through which the rotor shaft extends and includes a substantially cylindrical body having an open end and a radial wall opposite the open end, where the radial wall forms a first bearing pocket arranged to receive the front motor bearing therein. The BLDC motor further includes a stator assembly including a stator core having an aperture extending therethrough, stator teeth radially extending outwardly from the stator core and defining slots therebetween, and stator windings wound around the stator teeth. The BLDC motor further includes a stator mount including a radial member coupled to the open end of the motor housing, an elongated cylindrical member projecting axially from the radial member into the aperture of the stator core, a hollow portion extending through a length of the elongated cylindrical member through which the rotor shaft extends, and a second bearing pocket formed in the radial member supporting the rear motor bearing. The BLDC motor further includes an outer rotor including a cylindrical rotor core supporting at least one permanent magnet around an outer surface of the stator core. The BLDC motor further includes a rotor mount including an outer rim arranged to couple to the outer rotor, a radial wall extending inwardly from the outer rim, and an inner body mounted on the rotor shaft. An intermediary bearing is received at least partially within the aperture of the stator core to radially support the stator core relative to the rotor shaft.

In an embodiment, the radial wall of the motor housing includes an opening coaxially aligned with first bearing pocket through which the rotor shaft extends out of the motor housing.

In an embodiment, the second bearing pocket includes a recess having an open end facing away from the hollow portion.

In an embodiment, the BLDC motor includes an enclosure projecting around the recess from the radial member.

In an embodiment, the inner body of the rotor mount includes a first side provided adjacent the front motor bearing and a second side adjacent a radial plane formed by front ends of the stator windings.

In an embodiment, the BLDC motor includes a positional sensor board mounted on the stator assembly adjacent the stator mount, the positional sensor board including at least one magnetic sensor positioned to magnetically sense the permanent magnet of the rotor.

In an embodiment, signal sires are coupled to the positional sensor board and received through an opening of the stator mount.

In an embodiment, a ratio of a diameter of the aperture of the stator core to a diameter of the rotor shaft is at less than or equal to 1.2.

In an embodiment, the elongated cylindrical member of the stator mount extends through more than approximately 80% of a length of the aperture of the stator core and the intermediary bearing is disposed on a front end of the aperture adjacent the elongated cylindrical member of the stator mount.

In an embodiment, a power tool is provided including a housing and a BLDC motor according to any of the embodiments described above disposed within the housing.

In an embodiment, the removable battery pack outputs a maximum rated voltage of approximately 20 volts and a rated capacity of 2 Ampere-hours, and wherein the motor produces a maximum power output of at least 450 watts and the power tool has a power-to-weight ratio of at least 280 watts per pounds.

In an embodiment, the removable battery pack outputs a maximum rated voltage of approximately 12 volts and a rated capacity of 2 Ampere-hours, and wherein the motor produces a maximum power output of at least 340 watts and the power tool has a power-to-weight ratio of at least 200 watts per pounds.

In an embodiment, the power tool comprises a main body housing an output spindle, a handle portion having a girth smaller than the main body disposed between the battery receptacle and the handle portion, wherein the BLDC motor is housed within the handle portion.

In an embodiment, the girth of the handle portion is less than or equal to 34 mm.

In an embodiment, the main body supports a tool holder opposite the handle portion, and wherein a length of the tool from a front portion of the tool holder to a rear portion of the battery receptacle is less than or equal to 250 mm and the power tool produces a maximum power output of at least approximately 450 watts and a maximum speed of at least approximately 25,000 rotations-per-minute.

BRIEF DESCRIPTION OF THE DRAWINGS

The drawings described herein are for illustration purposes only and are not intended to limit the scope of this disclosure in any way.

Throughout this specification and figures like reference numbers identify like elements.

DETAILED DESCRIPTION

It is to be understood that both the foregoing general description and the following detailed description are exemplary and explanatory only and are intended to provide an explanation of various embodiments of the present teachings.

Figure 1:
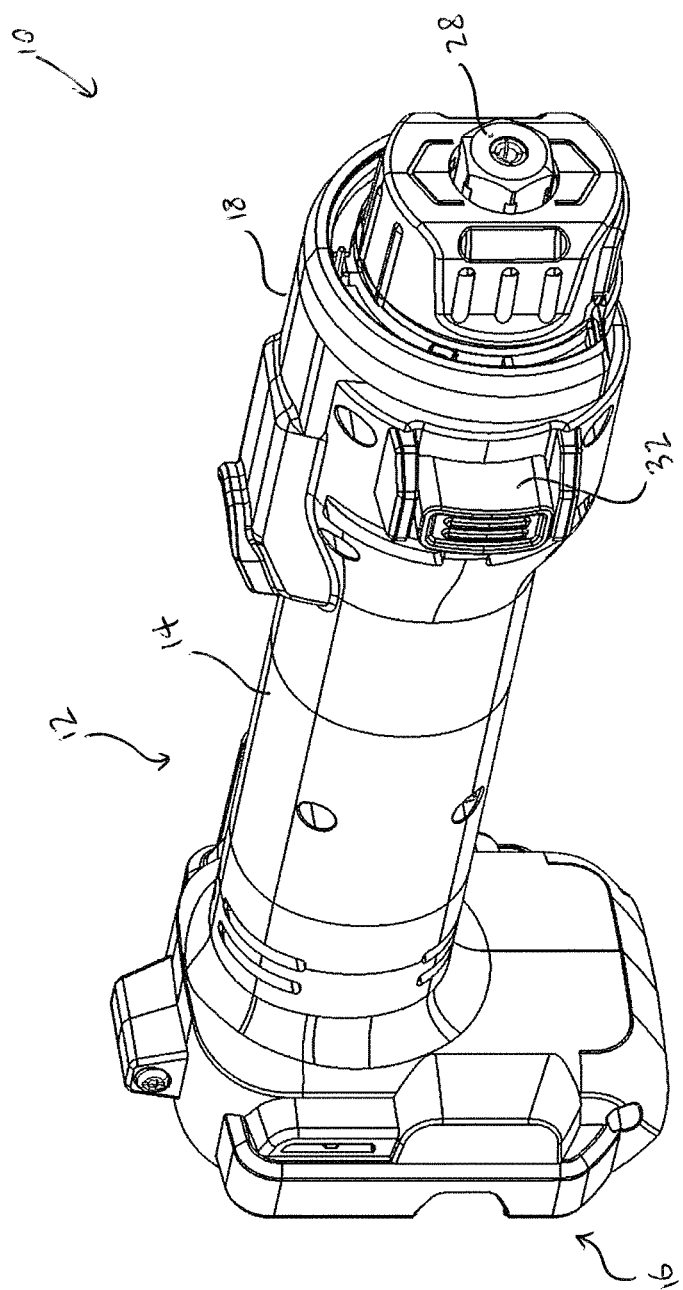
FIG. 1 depicts a perspective view of an electric power tool, according to an embodiment.
Figure 2:
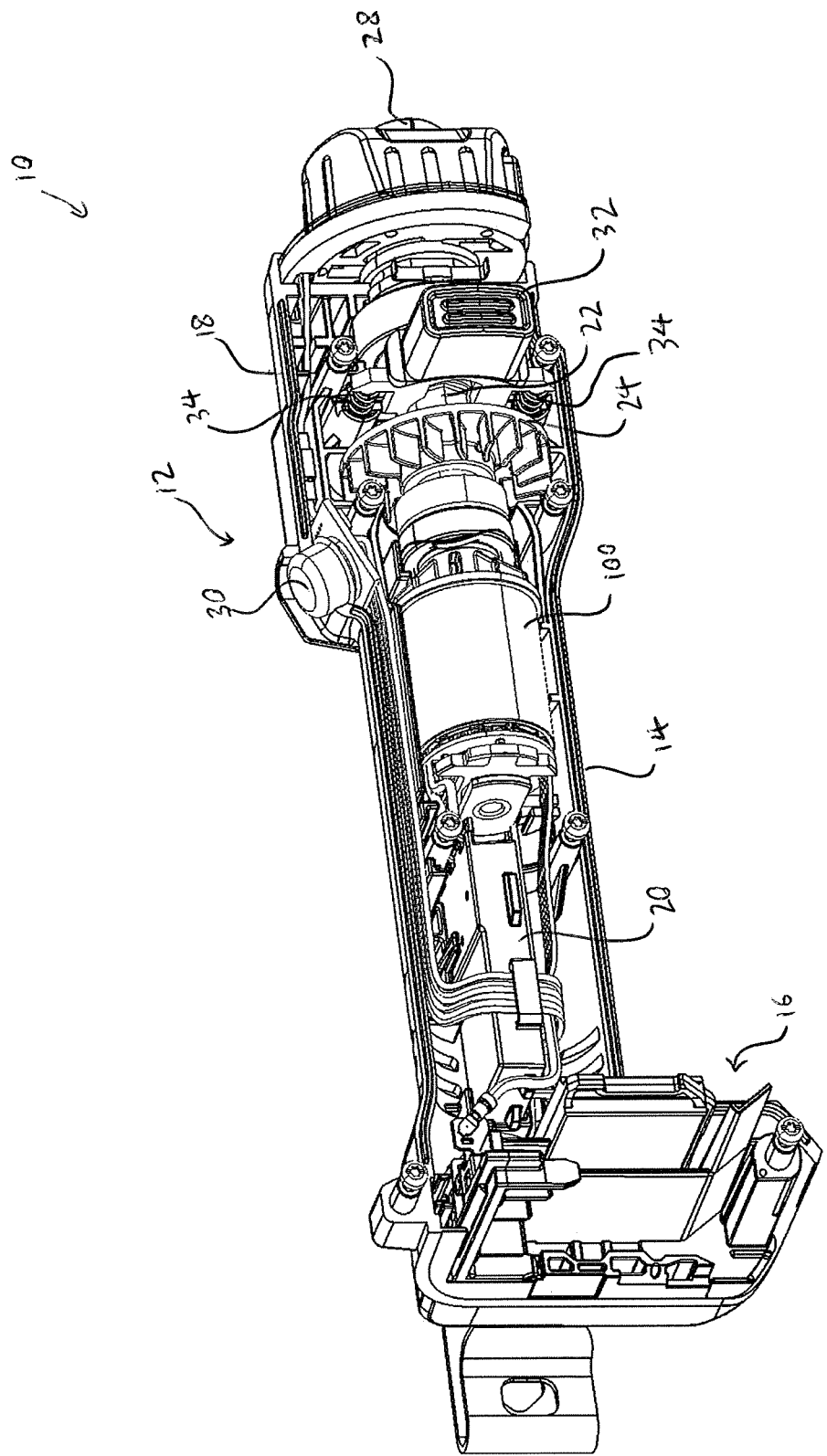
FIG. 2 depicts a side view of the electric power tool with a housing half removed to expose an outer-rotor brushless motor therein, according to an embodiment.
Figure 3:
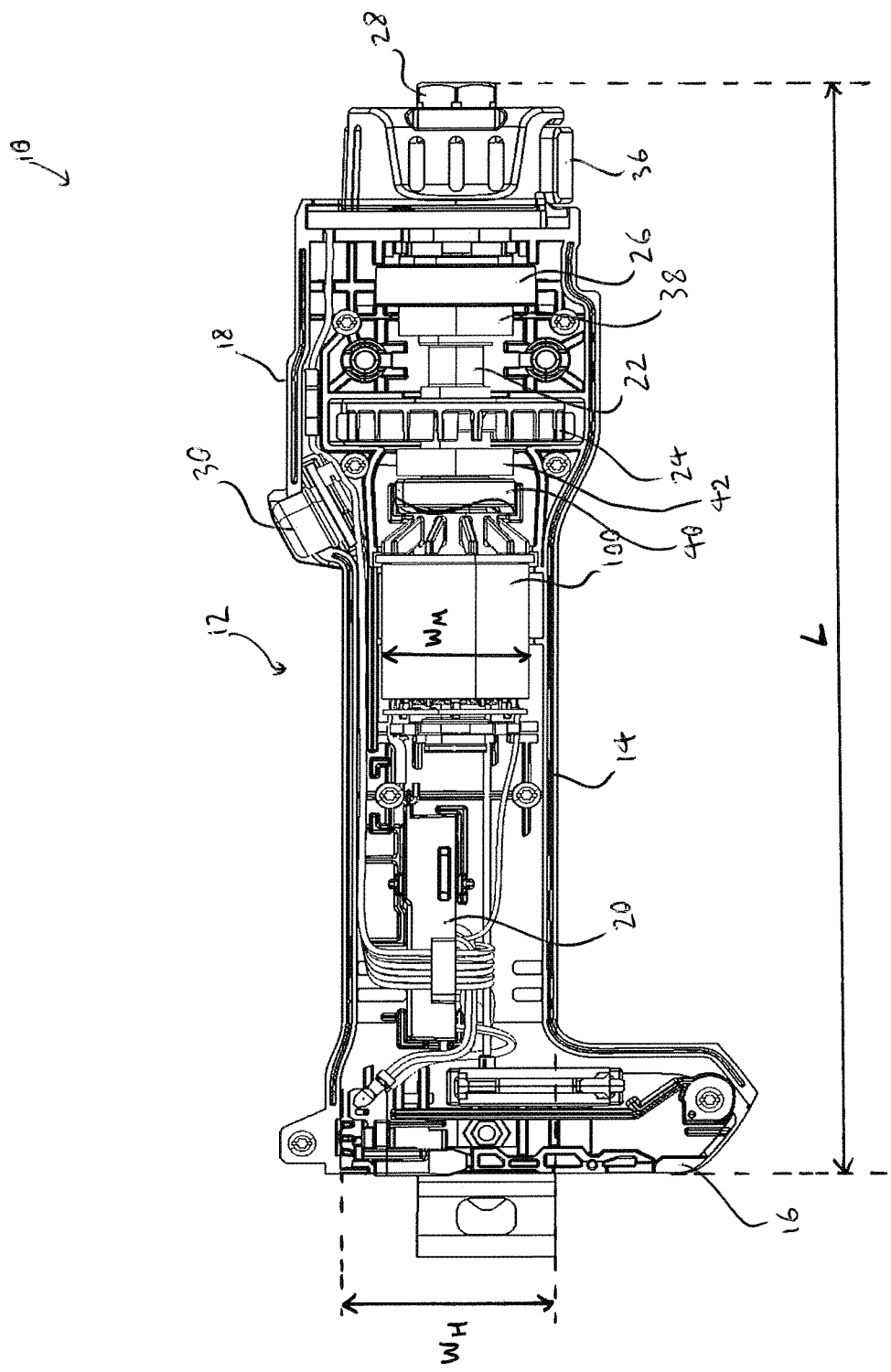
FIG. 3 depicts a side cross-sectional view of the electric power tool, according to an embodiment.

Referring to FIGS. 1-3, an electric power tool 10 is described herein, according to an embodiment. In an embodiment, power tool 10, which in this exemplary embodiment is a drywall cut-out tool, includes a housing 12 formed by two clam shells. The housing 12 includes a handle portion 14 (also referred to as the motor housing) within which an electric brushless motor 100 is supported, a battery receptacle 16 disposed at a foot of the handle portion 14, and a main body 18 forward of the handle portion 14.

The battery receptacle 16 is configured to receive and lock in a sliding battery pack, such as a 20V Max power tool battery pack. The motor 100 is orientated along a longitudinal axis of the power tool 10 within the handle portion 14. A control and/or power module 20 is also disposed within the handle portion 14 between the motor 100 and the battery receptacle 16. The module 20 includes control and switching components, for example an inverter switch circuit controlled by a programmable controller, that controls flow of electric current to the motor 100.

The main body 18 includes a larger diameter than the handle portion 14 and houses an output spindle 22 rotatably driven by the motor 100 therein. The main body 18 further houses a fan 24 mounted on the output spindle 22, a front spindle bearing 26 that rotationally supports the output spindle 22, and a tool holder 28 that receives a tool accessory (not shown) therein to be driven by the output spindle 22. In an embodiment, main body 18 further supports an ON/OFF switch 30 that sends a signal to the module 20 to activate the motor 100, and a spindle lock 32.

In an embodiment, spindle lock 32 is biased radially outwardly via a pair of springs 34 out of engagement with the output spindle 22. The spindle lock 32 includes a semi-hexagonal inner surface facing the output spindle 22. The output spindle 22, though cylindrical along most its axial length, includes a hexagonal outer profile in the area in-line with the spindle lock 32. When the spindle lock 32 is pressed by the user, its inner surface engages with the hexagonal outer profile of the output spindle 22 to lock the output spindle 22 in place, thus allowing the user to attach a tool accessory to the tool holder 28. In an embodiment, a collet release 36 may be disposed around the tool holder 28 to allow the user to tighten or loosen the tool accessory within the tool holder 28.

In an embodiment, in addition to front spindle bearing 26, an additional (middle) bearing 40 is mounted on the output spindle 22 adjacent the motor 100. The front and middle bearings 26 and 40 provide axial and radial support for the output spindle 22 and the motor 100 relative to the housing 12. The housing 12 includes retention features for retaining the front and middle bearings 26 and 40. In addition, in an embodiment, two slug rings 38 and 42 are mounted on the output spindle 22 adjacent the front and middle bearings 26 and 40. The slug rings 38 and 42 are used for appropriate balancing the output spindle 22 and the motor 100, where small holes are drilled into the slug rings 38 and 42 during balance testing until the desired balancing level is reached. This arrangement is helpful in reducing noise and vibration.

Figure 4:
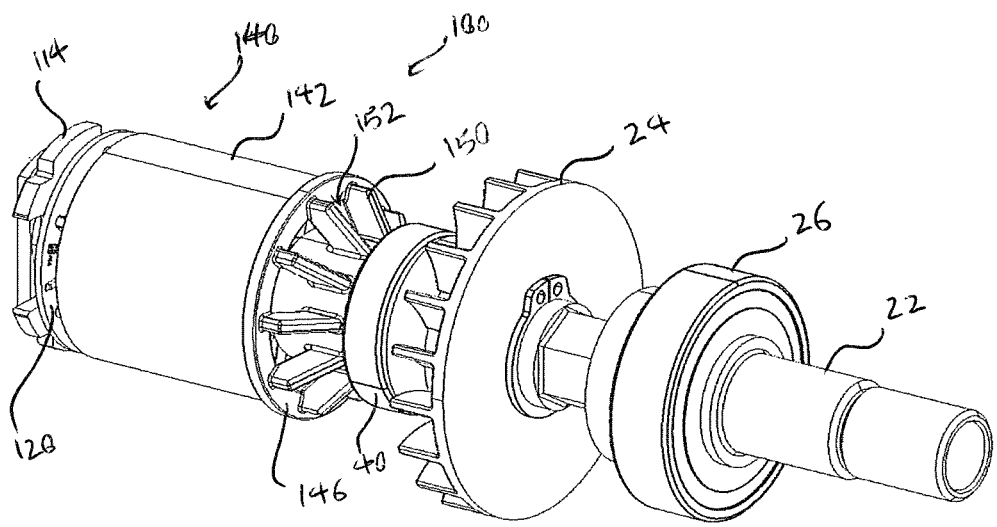
FIGS. 4 and 5 depict a perspective and cross-sectional assembled views of the outer-rotor brushless motor driving the output spindle, according to an embodiment.
Figure 5:
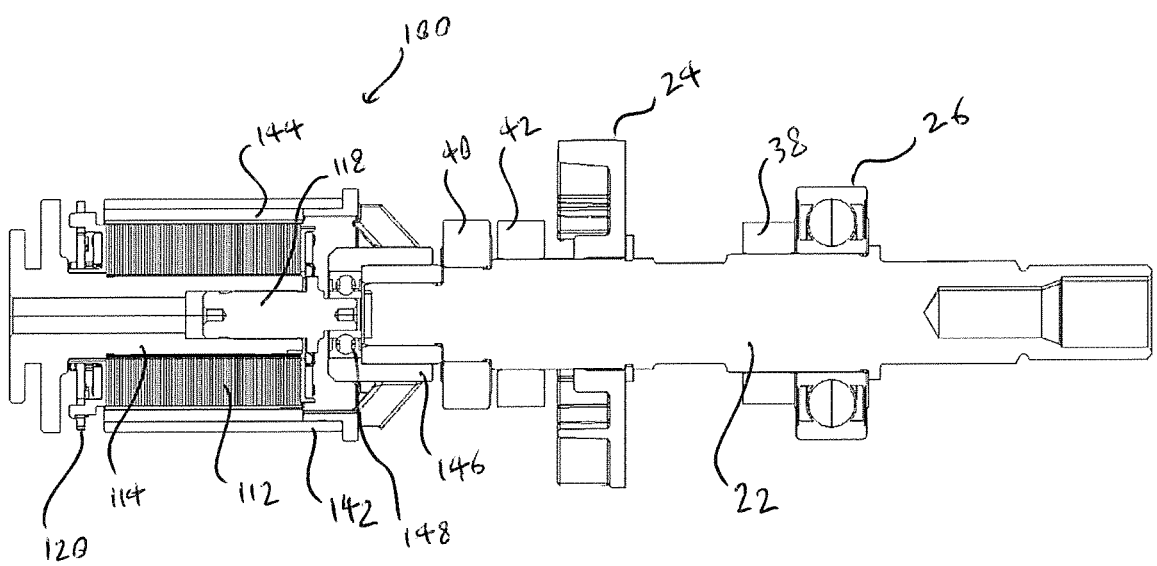
Figure 6:
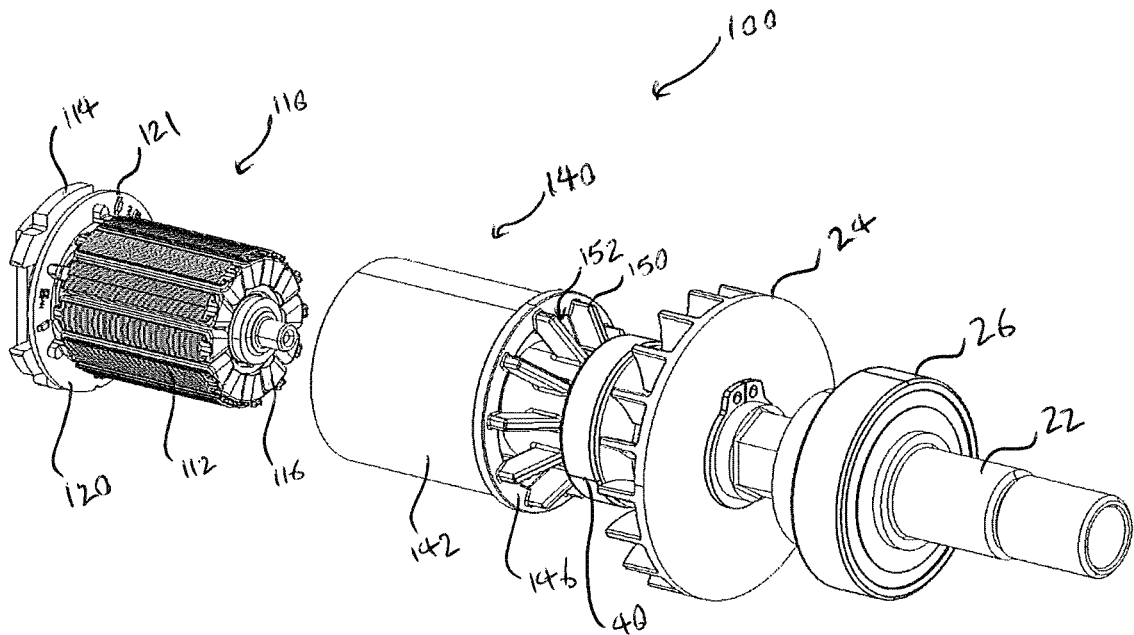
FIGS. 6 and 7 depict perspective partially-exploded modular views of the outer-rotor brushless motor and the output spindle, according to an embodiment.
Figure 7:
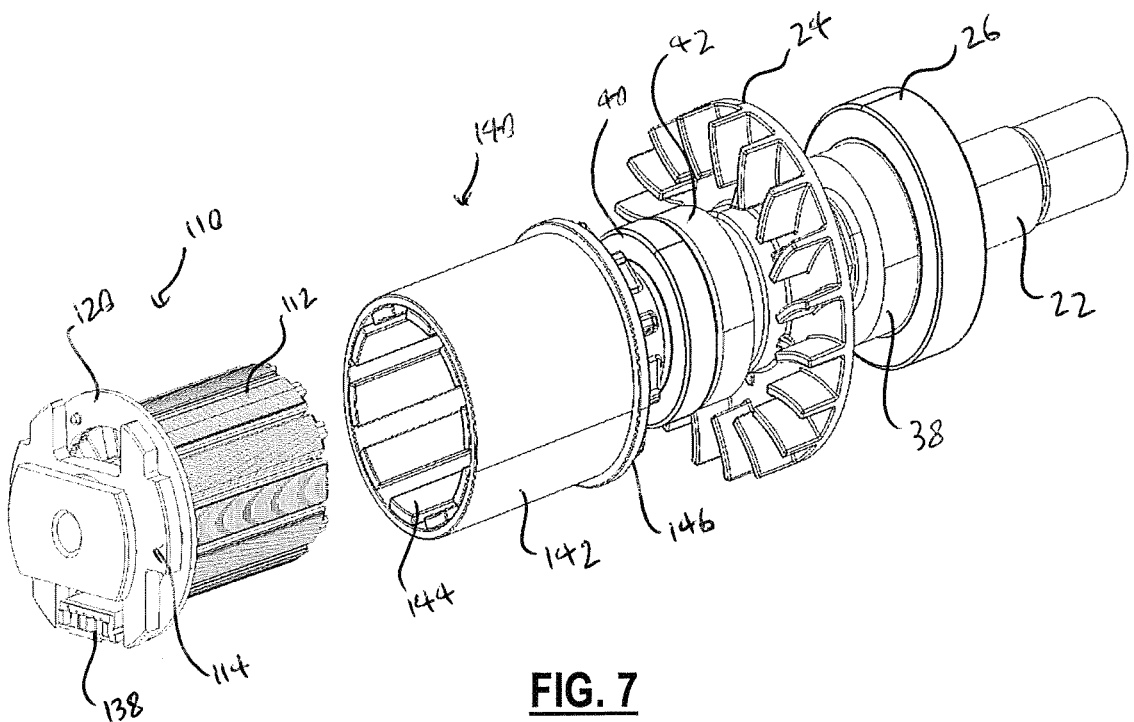

FIGS. 4 and 5 depict a perspective and cross-sectional assembled views of the outer-rotor brushless motor 100 driving the output spindle 24, according to an embodiment. FIGS. 6 and 7 depict perspective partially exploded modular views of the outer-rotor brushless motor 100 and the output spindle 24, according to an embodiment.

Referring to these figures, in an embodiment, outer-rotor brushless (BLDC) motor 100, which is also referred to as a modular outer-rotor motor 100, includes an inner stator assembly 110 disposed within an outer rotor assembly 140, according to an embodiment. In an embodiment, stator assembly 100 and rotor assembly 140 are modularly separable, as described here in detail.

In an embodiment, stator assembly 110 includes a stator lamination stack 112 formed by a series of laminations. The stator lamination stack 112 includes a stator core mounted on a stator mount 114 and a series of radially-outwardly projecting teeth on which stator windings 116 are wound. In an exemplary embodiment, the stator windings 116 are wound in three phases, which, when respectively energized by the control and/or power module 20, cause rotation of the rotor assembly 140. In an embodiment, a piloting pin 118 is received within an axial portion of the stator mount 114. Though piloting pin 118 is shown as a separate component, it should be understood that the piloting pin 118 can be provided integrally as a part and extension of the stator mount 114. In an embodiment, a positional sensor board 120 is mounted on an end of the stator 110 for sensing a rotary position of the rotor assembly 140. These features are described later in more detail.

In an embodiment, rotor assembly 140 includes a cylindrical rotor core 142 formed around the stator assembly 110, a series of magnets 144 surface-mounted on the inner surface of the rotor core 142 facing the stator assembly 110 with a small airgap therebetween, and a rotor mount 146 that supports the rotor assembly 110 relative to the stator assembly via motor bearing 148. In an embodiment, motor bearing 148 includes an outer race coupled to the rotor mount 146 and an inner race that receives the piloting pin 118 of the stator assembly 100. In an embodiment, rotor mount 146 includes radial walls 150 forming air inlets 152 therebetween that allow fluid communication between the fan 24 and the stator assembly 110.

Figure 8:
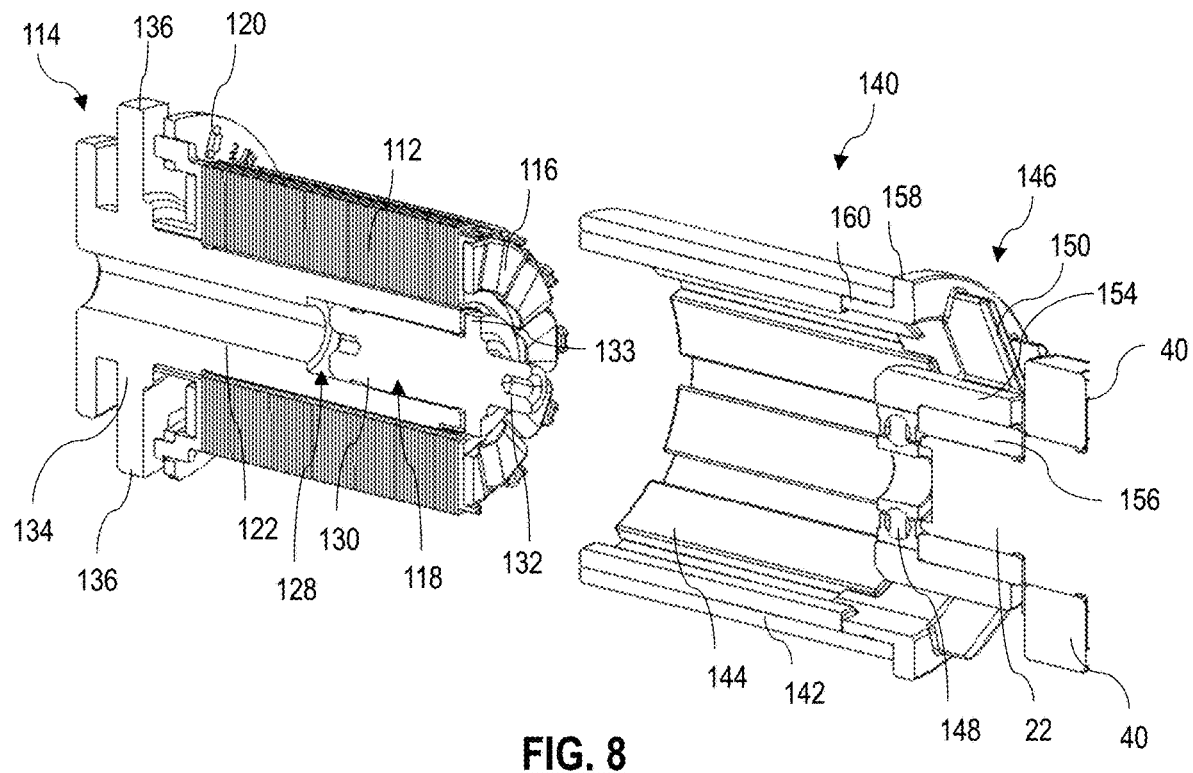
FIG. 8 depicts a perspective cross-sectional view of the outer-rotor brushless motor prior to assembly of the stator within the rotor, according to an embodiment.
Figure 9:
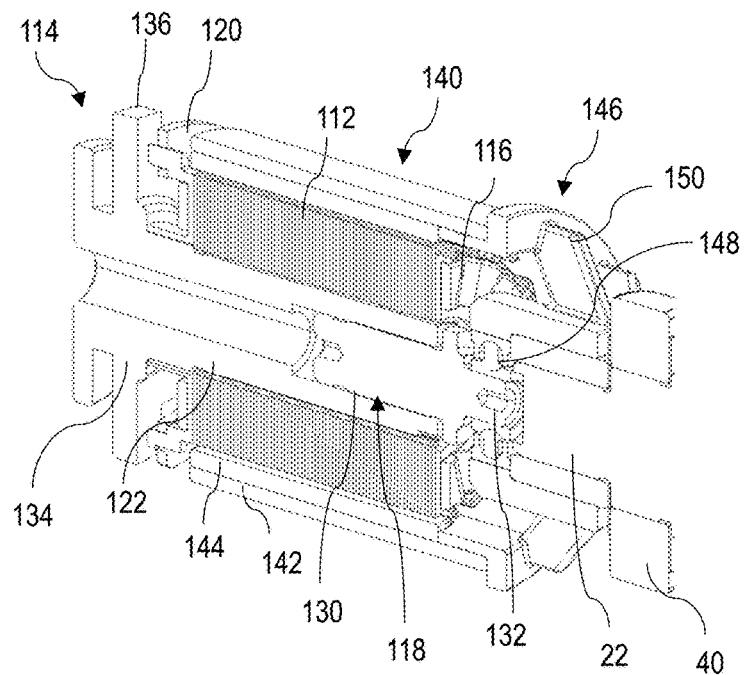
FIG. 9 depicts a perspective cross-sectional view of the outer-rotor brushless motor after assembly of the stator within the rotor, according to an embodiment.

FIGS. 8 and 9 depict perspective cross-sectional views of the outer-rotor brushless motor 100 prior to and after assembly of the stator assembly 110 within the rotor assembly 140, according to an embodiment. In an embodiment, as described below in more detail, rotor mount 146 is formed around the outer race of the motor bearing 148. This may be done by, for example, press-fitting, insert-molding, heat-staking, or other similar process. The output spindle 22 is also press-fit or otherwise securely received within the rotor mount 146. This arrangement allows the rotor assembly 140, the fan 24, and the output spindle 22 to be tested together as a unit for balancing and vibration, independently and separately from the stator assembly 110.

In an embodiment, piloting pin 118 includes a rear portion 130 having a generally cylindrical body that is located within the stator core 112, a front portion 132 also having a generally cylindrical body with a smaller diameter than the rear portion 132 that extends away from the stator core 112, and an intermediary rim portion 133 projecting annularly between the rear portion 130 and the front portion 132. The front portion 132 is sized to be slidingly and form-fittingly received within an inner race of the motor bearing 148.

The stator assembly 110 is assembled into the rotor assembly 140 by simply inserting the rear portion 132 of the piloting pin 118 into the inner race of the motor bearing 148. In this manner, one end of the stator assembly 110 is secured radially and axially with respect to the rotor assembly 140. In an embodiment, power tool housing 12 includes retention features that radially and axially secure the stator mount 114. Once the motor assembly 100 is mounted into the power tool housing 12, the retention features of the housing 12 ensure that the other end of the stator assembly 110 is radially and axially secured with respect to the rotor assembly 140, maintaining an airgap therebetween.

Utilizing the outer-rotor motor assembly 100 as described above into rotary power tool 10 offers power density benefits not previously seen in comparable conventional power tools. In an embodiment, motor assembly 100 includes an outer diameter (i.e., diameter of the rotor core 142, WM in FIG. 3) of approximately 22 mm to 38 mm, preferably approximately 24 mm to 36 mm, preferably approximately 26 mm to 34 mm, and more preferably approximately 28 mm to 32 mm. The stator length is approximately 20 mm to 30 mm, preferably approximately 25 mm. This motor configuration is configured to provide maximum power output of approximately 400 W to 550 W, preferably 450 W to 500 W, and more specifically approximately 470 W, with a maximum speed of approximately 25,000 to 30,000 rpm. The motor assembly 100 may be suitable for compact and light-weight power tool applications that require a low power output to weight ratio.

In the exemplary embodiment, power tool 10 has a handle (motor housing) diameter ($W_H$, FIG. 3) of approximately 32 mm to 48 mm, preferably approximately 34 mm to 46 mm, preferably approximately 36 mm to 44 mm, and more preferably approximately 38 mm to 42 mm. The ratio of power output to motor housing diameter (i.e., handle girth) is approximately in the range of 10 to 12 W per mm. At a length (L, FIG. 3) of approximately 220 mm to 250 mm, power tool 10 has a weight of approximately 1.5 lbs to 1.7 lbs, preferably approximately 1.6 lbs. When using a power tool battery pack having a maximum rated voltage of 20V and rated capacity of 2 Amp-hours, power tool 10 is capable of outputting a maximum power output of at least approximately 450 to 500 watts, preferably at least 470 watts, offering a power-to-weight ratio of approximately 270 to 320 W per pound, more preferably approximately 280 to 310 W per pound, and more preferably approximately 290 to 300 W per pounds. Similarly, when using a power tool battery pack having a maximum rated voltage of 12V and rated capacity of 2 Amp-hours, power tool 10 is capable of outputting a maximum power output of at least approximately 330 to 360 watts, preferably at least 340 watts, offering a power-to-weight ratio of approximately 190 to 240 W per pound, more preferably approximately 200 to 230 W per pound, and more preferably approximately 210 to 220 W per pounds. The power output and power to weight ratio may be increased when using a higher capacity battery pack.

These ratios of power to motor housing and power to weight have not been seen in comparable power tools with comparable power outputs. Power tool 10 as described in this disclosure is unique in its portability and ease of use without sacrificing power output and speed needed to handle required cutting applications.

Figure 10:
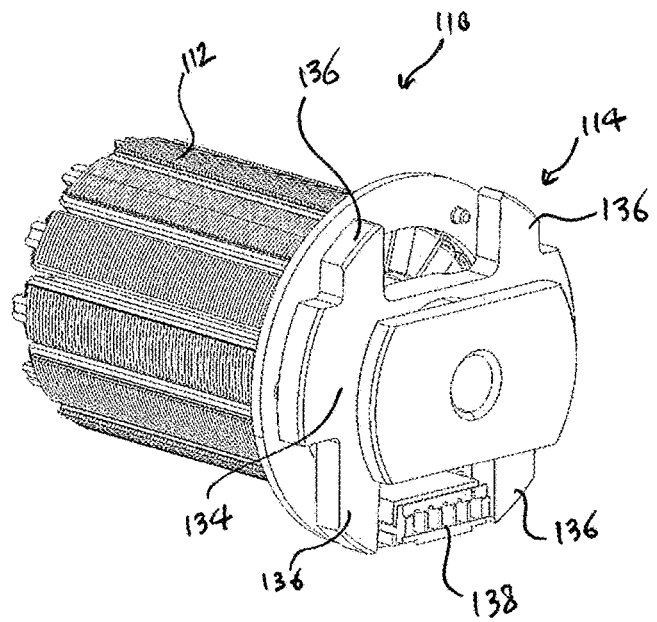
FIGS. 10 and 11 depict a perspective view and a partially-exploded perspective view of the stator assembly, according to an embodiment.
Figure 11:
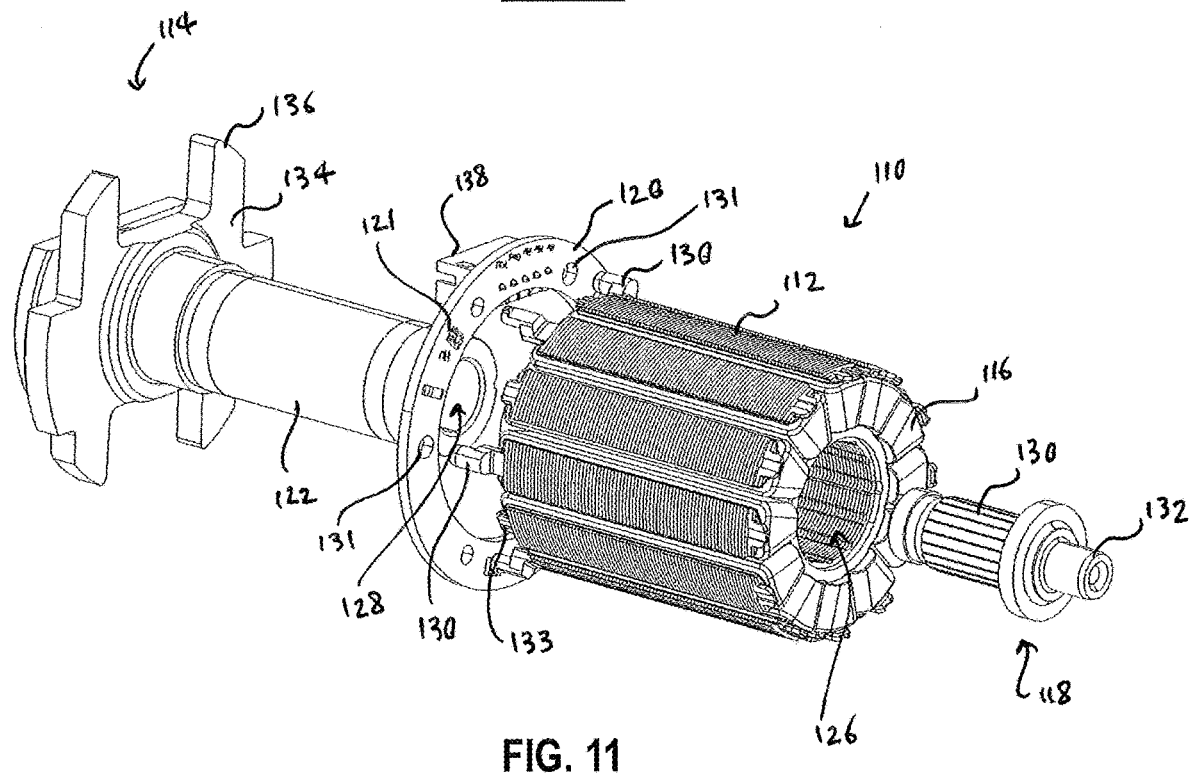

FIGS. 10 and 11 depict a perspective view and a partially-exploded perspective view of the stator assembly 110, according to an embodiment. As shown here, and with continued reference to FIGS. 8 and 9, stator mount 114 includes an elongated cylindrical portion 122 sized to be received securely within a central aperture 126 of the stator lamination stack 112. In an embodiment, the stator lamination stack 112 may be press-fitted over the cylindrical portion 122 of the stator mount 114. Cylindrical portion 122 includes a tubular front portion 124 in which a hollow portion 128 is sized to receive the rear portion 130 of the piloting pin 118 by, for example, press-fitting. The front portion 132 of the piloting pin 118 is received within the inner race of the motor bearing 148, as described above. In an embodiment, the hollow portion 128 may extend through the entire length or a portion of the cylindrical portion 122. In an embodiment, as shown in FIGS. 8 and 9, cylindrical portion 122 includes a hollow opening that meets the hollow portion 128, but has a smaller diameter than the hollow portion 128.

In an embodiment, stator mount 114 further includes a radial portion 134 at an end of the cylindrical portion 122 disposed adjacent to the positional sensor board 120. Radial portion 134 includes radial projections 136 that mate with corresponding retention features of the tool housing 12 to axially and rotationally retain the stator mount 114.

In an embodiment, positional sensor board 120 is disc-shaped with an outer diameter that approximately matches the outer diameter of the rotor assembly 140 and an inner diameter that is slightly smaller than the diameter of the stator lamination stack 112 but is slightly greater than a diameter formed by the stator windings 116. In this manner, in an embodiment, the positional sensor board 120 can be mounted at the end of the stator lamination stack 112 (or on an end insulator 133 mounted at the end of the stator lamination stack 112) around the ends of the stator windings 116. Positional sensors 121, which are magnetic sensors such as Hall Effect sensors, are mounted on the positional sensor board 120 outside the diameter of the stator lamination stack 112 facing axial ends of the rotor magnets 144 to sense a magnetic leakage flux of the rotor magnets 144. A connector 138 is mounted on the rear surface of the positional sensor board 120 positioned between two projections 136 of the stator mount 114. Positional signals from the positional sensors 121 are sent to the control and/or power module 20 via the connector 138.

In an embodiment, a series of legs 130 project axially into corresponding through-holes 131 of the positional sensor board 120 to support the positional sensor board 120 with respect to the stator assembly 110. In an embodiment, legs 130 are provided integrally as a part of the end insulator 133. Alternatively, three or all six of the legs 130 are motor terminals that facilitate electrical connection between the windings and the positional sensor board 120. In the latter embodiment, positional sensor board 120 includes metal routings that couple the motor terminals 130 to the connector 138. In a further embodiment, positional sensor board 120 also includes metal routings that facility connections between the respective motor terminals 130 in, for example, a series or a parallel, and a wye or a delta, configuration.

Figure 12:
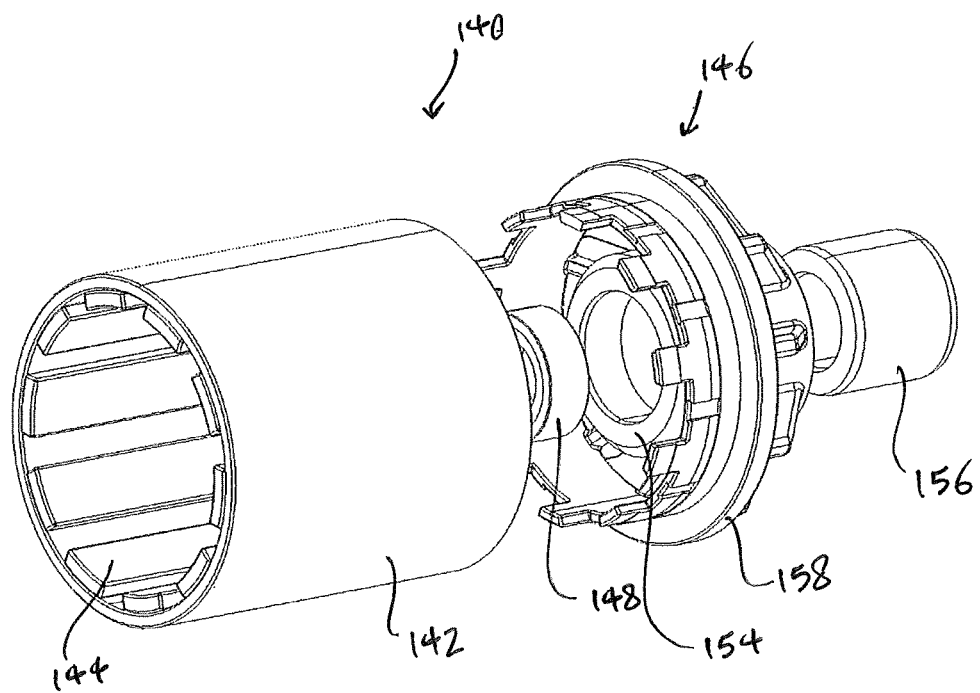
FIGS. 12 and 13 depict perspective partially-exploded views of the rotor assembly, according to an embodiment.
Figure 13:
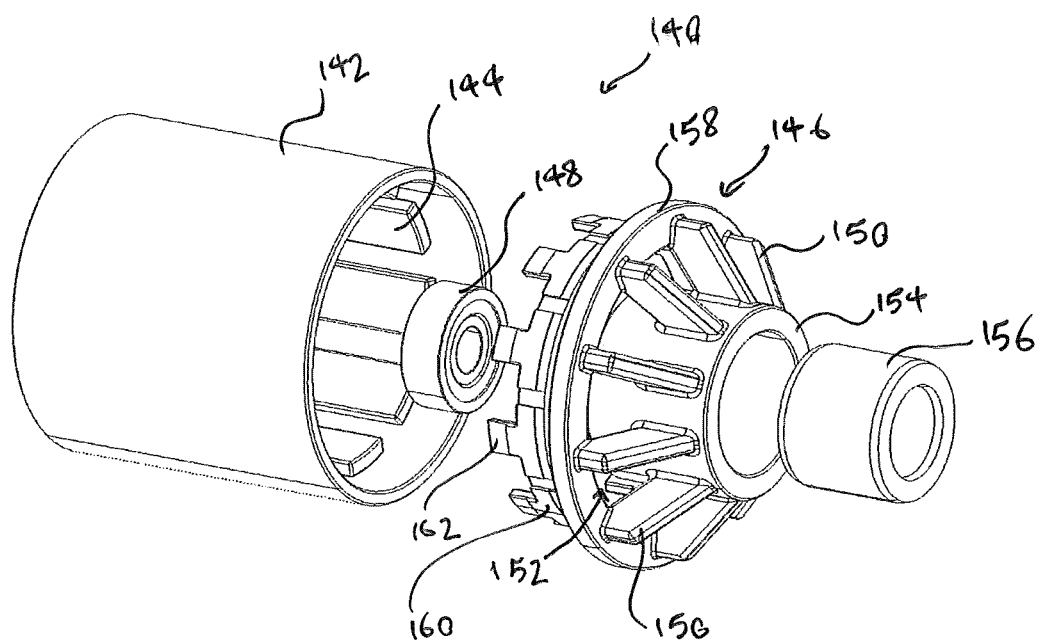
Figure 14:
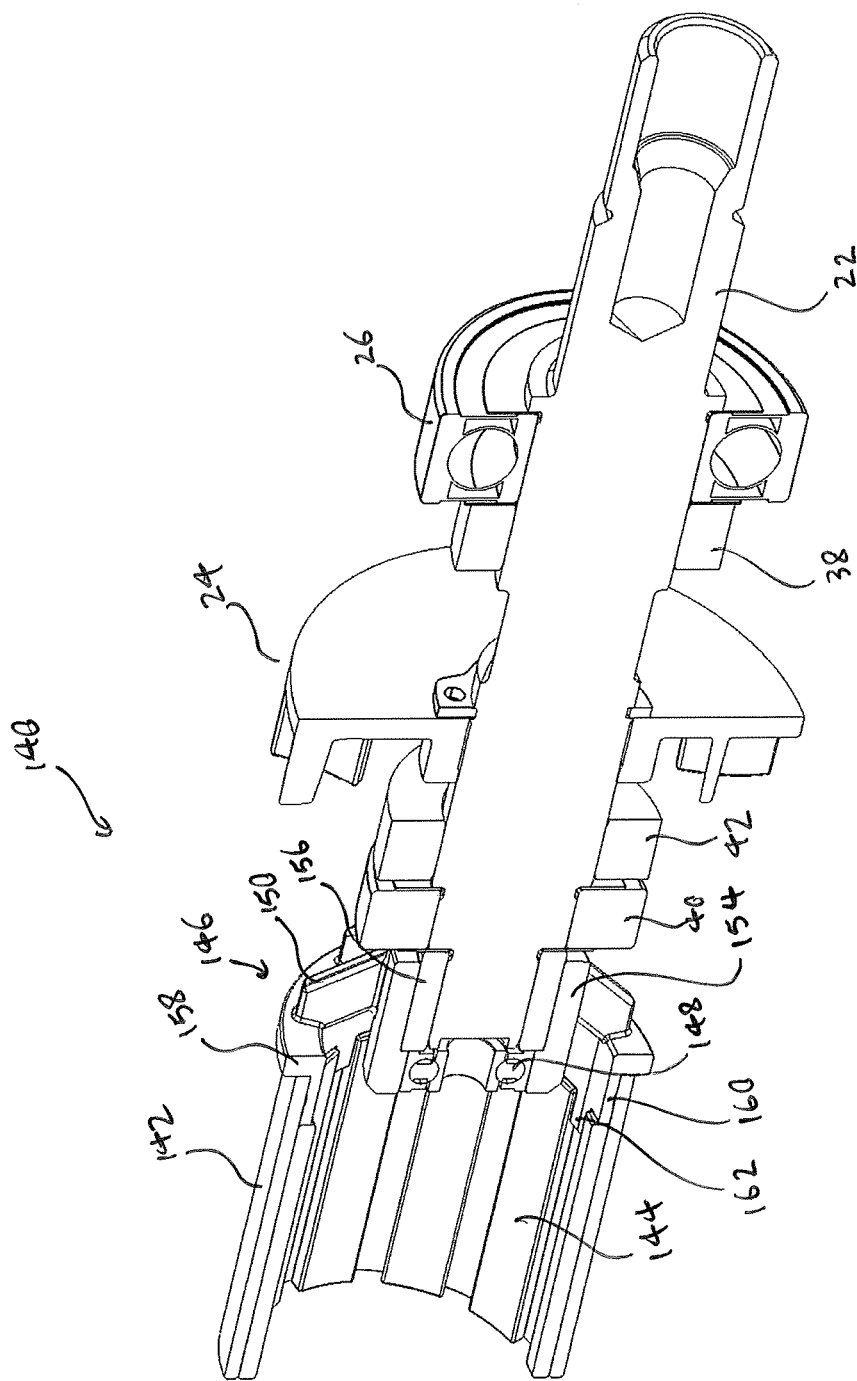
FIG. 14 depicts a perspective cross-sectional view of the rotor assembly together with the output spindle, according to an embodiment.

FIGS. 12 and 13 depict perspective partially-exploded views of the rotor assembly, according to an embodiment. FIG. 14 depicts a perspective cross-sectional view of the rotor assembly together with the output spindle, according to an embodiment. As shown in these figures, and with continued reference to FIGS. 8-11, in an embodiment, rotor mount 146 of the rotor assembly 140 includes the inner body 154 of the rotor mount 146 that is substantially cylindrical and forms a bearing pocket at its rear end that receives the outer race of the motor bearing 148 therein, by e.g., press-fitting, heat-staking, or other means, through one end. In an embodiment, a front end of the inner body 154 may be open-ended and receive a spacer 156. An end of the output spindle 22 is securely received via the spacer 156 within the front end of the inner body 154. This arrangement allows ends of the output spindle 22 and the piloting pin 118 to be received within the inner body 154 of the rotor mount 146 adjacent one another without blocking the air inlets 152 of the rotor assembly 140.

In an embodiment, radial walls 156 project outwardly at an angle from the inner body 154 to an outer rim 158. A cylindrical lip 160 projects axially from the outer rim 158 fittingly into the rotor core 142 to secure the rotor core 142 to the rotor mount 146. In an embodiment, the lip 160 mates with ends of the rotor magnets 144 and a series of projections 162 project from the lip 160 between the rotor magnets 144 for improved alignment and positioning.

In an embodiment, the radial wall 156 is coupled at an angle to front end of the inner body 154, and the rear end of the inner body 154 extends axially rearwardly from the front end at an acute angle relative to the radial wall 156. This arrangement allows the motor bearing 148 to be radially substantially aligned with the contact surface of the outer rim 158 and the rotor core 142.

Figure 15:
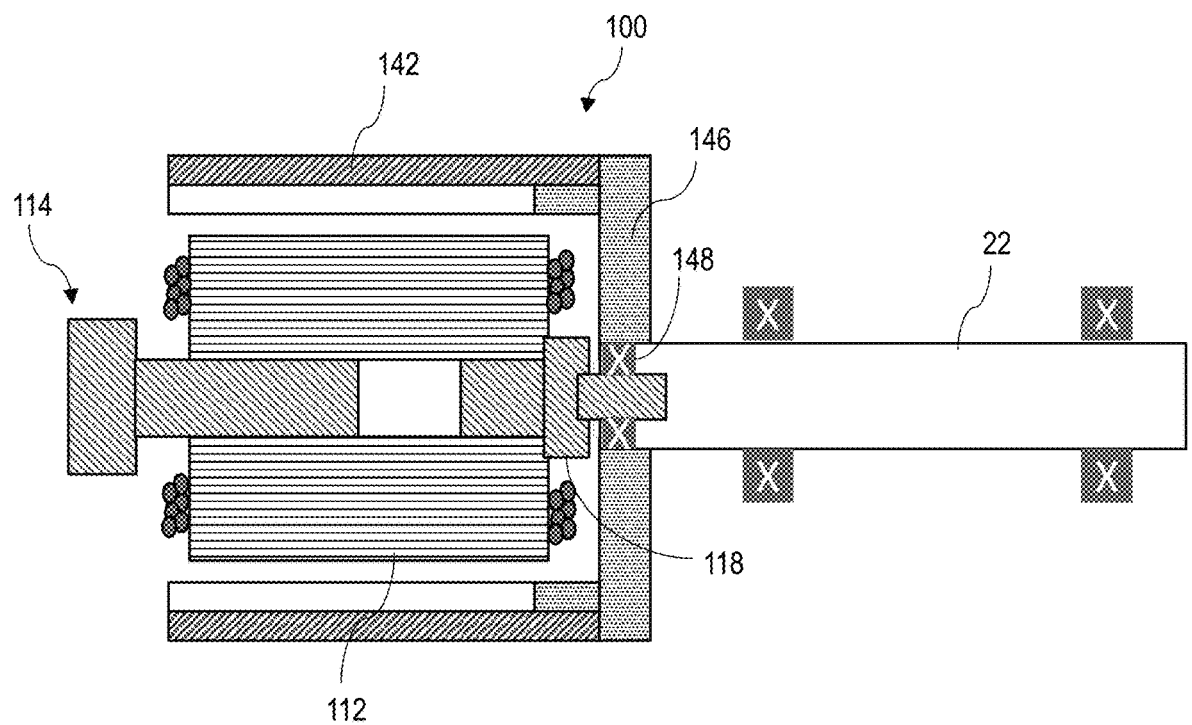
FIGS. 15 and 16 depict cross-sectional views of the motor assembly attached to two output spindles having different size diameters, according to an embodiment.
Figure 16:
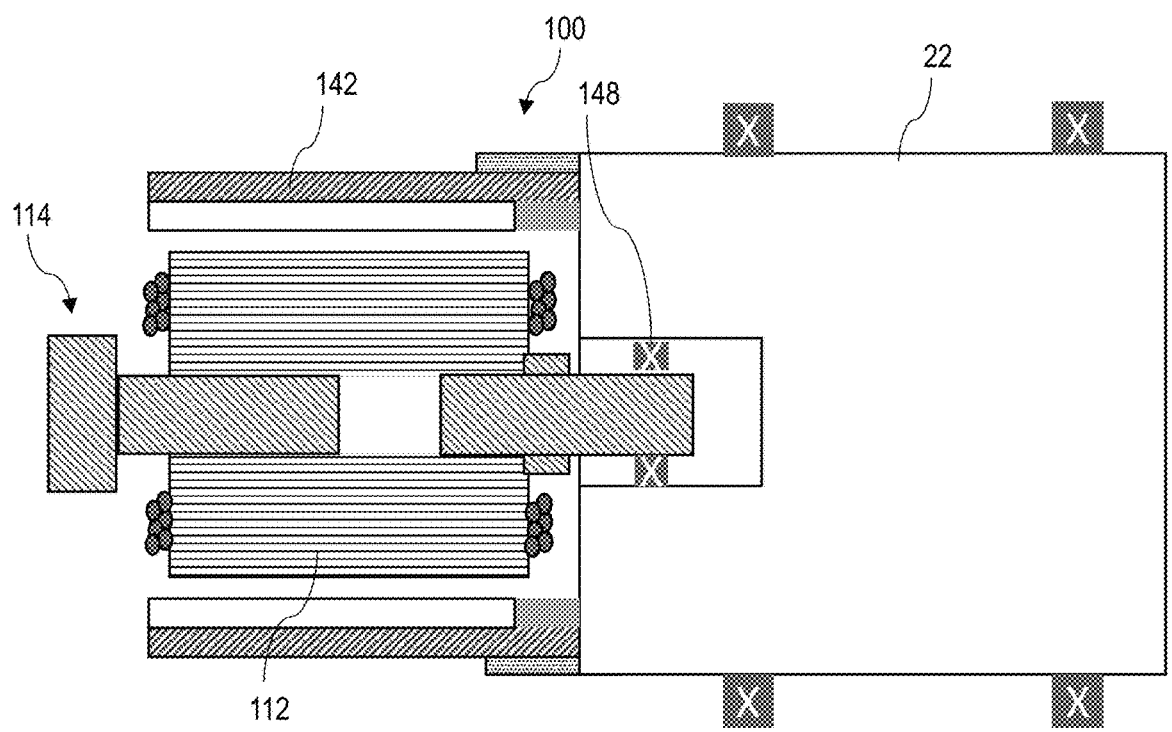

FIGS. 15 and 16 depict cross-sectional views of the motor assembly 100 attached to two output spindles 22 having different size diameters, according to an embodiment. As shown in these figures, different diameter output spindles 22 may be coupled to the motor assembly 100 of this disclosure. As shown in FIG. 15, output spindle 22 may have a greater diameter than motor bearing 148 such that a rear cavity of the output spindle 22 receives the outer race of the motor bearing 148 directly. In an embodiment, rotor mount 146 is mounted on the outer surface of the output spindle 22. In another embodiment, as shown in FIG. 16, the output spindle 22 may include a diameter that is substantially equal to or greater than the diameter of the rotor core 142. In this embodiment, output spindle 22 may be integrally incorporated with the rotor mount 146 in one piece and coupled to the rotor core 142

Figure 17:
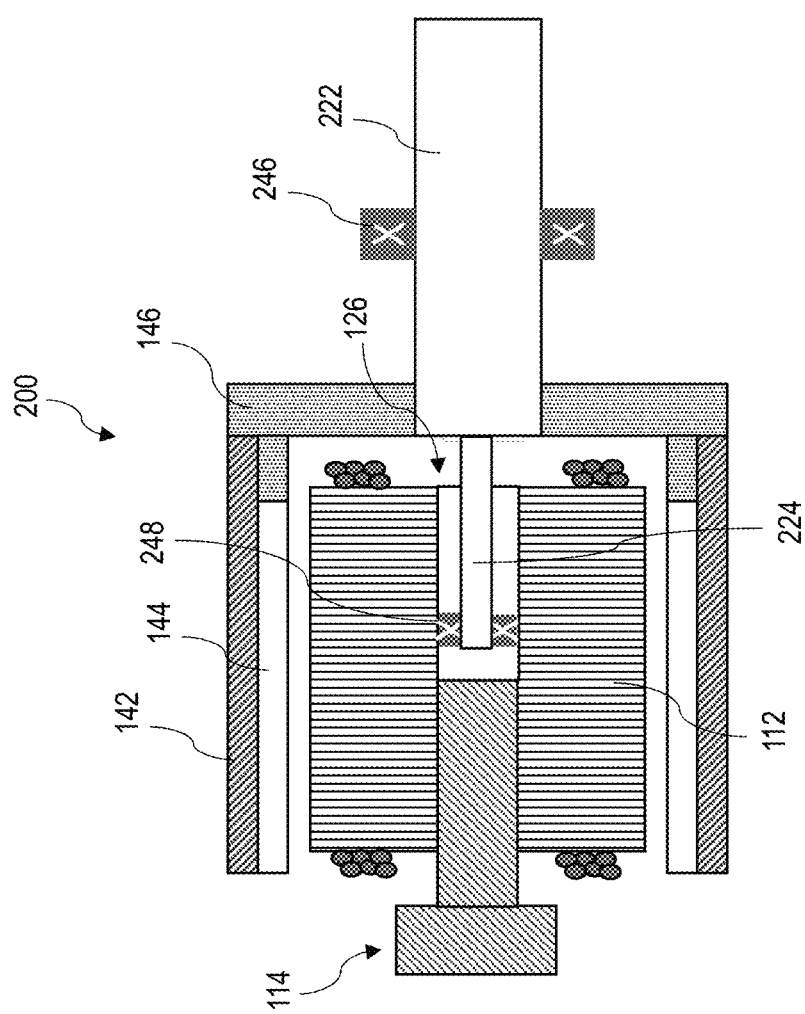
FIG. 17 depicts a cross-sectional view of a motor assembly, according to an alternative embodiment.

FIG. 17 depicts a cross-sectional view of a motor assembly 200, according to an alternative embodiment. Motor assembly 200 is similar in many respects to motor assembly 100 described above, and to the extent that the same or similar elements are provided, the same reference numerals are used. The difference between motor assembly 200 and the above-described motor assembly 100 is that the output spindle 222 is provided with an extension pole 224 received into the central opening 126 of the stator assembly 110 and is supported with respect the stator via rear bearing 248. In an embodiment, outer race of the rear bearing 248 is supported within the stator central opening 126 and its inner race received the extension 224 of the output spindle 222. The output spindle 222 is supported to the tool housing via front bearing 246.

Figure 18:
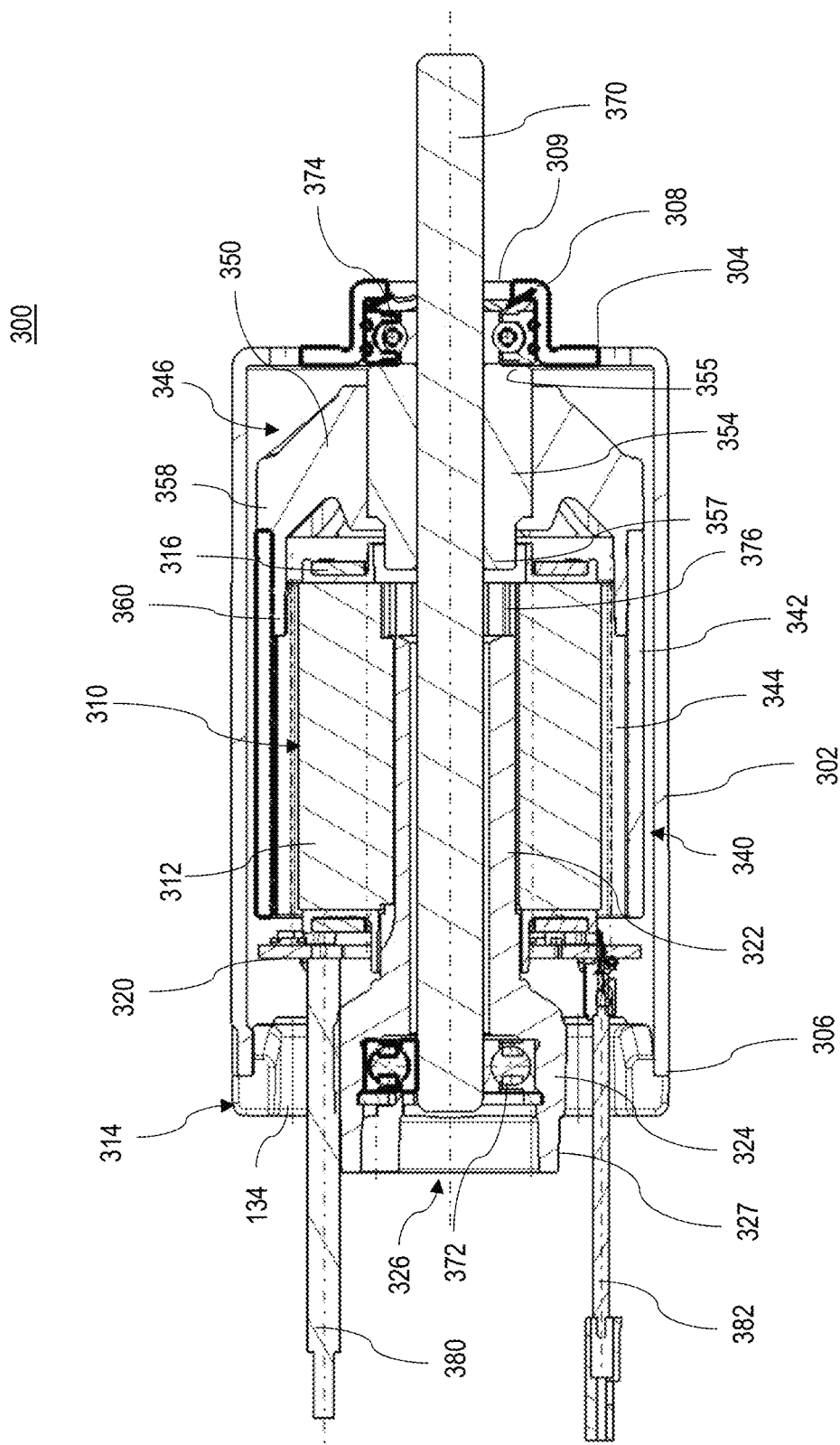
FIG. 18 depicts a cross-sectional view of a motor assembly, according to yet another embodiment.

FIG. 18 depicts a cross-sectional view of a motor assembly 300, according to an alternative embodiment.

In an embodiment, outer-rotor brushless (BLDC) motor 300, which is also referred to herein as a canned outer-rotor motor 300, is similar in some respects to BLDC motor 100 described above. In an embodiment, BLDC motor 300 includes an inner stator assembly 310 disposed within an outer rotor assembly 340, according to an embodiment.

In an embodiment, stator assembly 310 includes a stator lamination stack 312 formed by a series of laminations. The stator lamination stack 312 includes a stator core mounted on a stator mount 314 and a series of radially-outwardly projecting teeth on which stator windings 316 are wound. In an embodiment, stator mount 314 includes an elongated cylindrical portion 322 sized to be received securely within a central aperture of the stator lamination stack 312, and a radial portion 134 at an end of the cylindrical portion 322 disposed adjacent to the positional sensor board 320. In an embodiment, the stator lamination stack 312 may be press-fitted over the cylindrical portion 322 of the stator mount 314. In an embodiment, a positional sensor board 320 is mounted on an end of the stator assembly 310 for sensing a rotary position of the rotor assembly 340.

In an embodiment, rotor assembly 340 includes a cylindrical rotor core 342 formed around the stator assembly 110, a series of magnets 344 surface-mounted on the inner surface of the rotor core 342 facing the stator assembly 310 with a small airgap therebetween. In an embodiment, a rotor mount 346 supports the rotor assembly 340. In an embodiment, rotor mount 346 includes an inner body 354 that is substantially cylindrical, radial wall 350 projecting angularly outwardly from the inner body 354 and forming air inlets therebetween, and an outer rim 358. A cylindrical lip 360 projects axially from the outer rim 358 fittingly into the rotor core 342 to secure the rotor core 342 to the rotor mount 346.

Unless otherwise described below, stator assembly 310, stator mount 314, rotor assembly 340, and rotor mount 346 include similar features to stator assembly 110, stator mount 114, rotor assembly 140, and rotor mount 146 described above. Additionally, the motor size, power output, and power to weight ratios described above are also applicable to the present embodiment. Unlike BLDC motor 100, BLDC motor 300 of this embodiment does not include a modular and separable design. Rather, the stator assembly 310 and the rotor assembly 340 are provided within a motor housing 302 that structurally support the stator assembly 310 and the rotor assembly 340 via rear motor bearing 272 and front motor bearing 374, and a rotor shaft 370 that extends axially through the motor housing 302. Further, in an embodiment, an intermediate ball bearing 376 is provided within the stator assembly 310 mounted on the rotor shaft 370. These features are described here in detail.

In an embodiment, inner body 354 of the rotor mount 346 is initially securely mounted on the rotor shaft 370, by for example press-fitting or other known method, during the assembly process. Inner body 354 may be a metal hub. This allows the rotor mount 346 to securely and fixedly support the rotor assembly 340 relative to the rotor shaft 370

In an embodiment, motor housing 302 includes a generally cylindrical body extending from a radial wall 304 to an open end 306. Radial wall 304 includes a recessed portion 308 forming a bearing pocket for placement of the front bearing 374. During the assembly process, the front bearing 372 is securely disposed within the recessed portion 308 of the radial wall 304. The rotor assembly 340 and rotor mount 346 are then together placed within the motor housing 302 as the rotor shaft 370 received through the inner race of the front bearing 372. The rotor shaft 370 is extended out of an opening 309 provided within the recessed portion 308 of the radial wall 304 until the front bearing 372 is located adjacent the inner body 354 of the rotor mount 346.

In an embodiment, stator mount 314 includes recessed portion 324 formed radially in-line with the radial wall 304. The recessed portion 324 is disposed rearwardly of and coaxially with the elongated cylindrical portion 322. Recessed portion 324 includes an open end 326 facing away from the elongated cylindrical portion 322. In an embodiment, an enclosure 327 projects from the radial wall 304 around the recessed portion 324. Recessed portion 324 forms a bearing pocket within which the rear bearing 372 is received through the open end 326 and secured. In an embodiment, intermediary bearing 376 is placed at least partially within a front opening of the stator core 320 adjacent the front end of the elongated cylindrical portion 322. In an embodiment, a series of electric motor wires 380 for driving the stator windings 316 and control wires 382 coupled to the sensors of the positional sensor board 320 are received through the stator mount 314.

In an embodiment, during the assembly process, after completion of the steps above, the rear end of the rotor shaft 370 is received through the elongated cylindrical portion 322 and securely received into an inner race of the rear bearing 372. The radial wall 304 is also mated with and fastened to open end 306 of the motor housing 302. In this manner, the stator mount 314 radially supports the stator assembly 310, rotor shaft 370, and motor housing 30 relative to one another. In an embodiment, a cap (not shown) is mounted on the enclosure 327 to fully enclose the rear bearing 372 within the recessed portion 324.

In an embodiment, radial wall 350 of the rotor mount 346 is provided as a series of walls (or blades) defining openings in between (see 150 in FIG. 13 as an example). This allows the radial wall 350 to generate an airflow through the motor assembly 300, particularly in contact with the stator windings 316, without need for an additional fan disposed within the motor housing 302.

In an embodiment, the inner body 354 of the rotor mount includes a first side 355 provided adjacent to or in contact with the front motor bearing 374 and a second side 357 provided adjacent or intersecting a radial plane formed by front ends of the stator windings 316. In an embodiment, second side 357 has a smaller diameter than the first side 355, which allows the inner body 354 to project into the body of the stator assembly 310 between the front end portions of the stator windings 316, forming a labyrinth for protection against ingress of debris and contamination into the area of the intermediary bearing 376.

In an embodiment, the rotor shaft 370 has an outer diameter of approximately 4 mm to 6 mm, preferably approximately 5 mm. The inner diameter of the stator lamination stack 312, i.e., the diameter of the central aperture and/or the outer diameter of the elongated cylindrical portion 322, is approximately 8 mm to 12 mm, preferably approximately 10 mm. Thus, the ratio of the inner diameter of the stator lamination stack 312 to the outer diameter of the rotor shaft 370 is approximately 1.5 to 3, preferably less than 2.5, more preferably less than 2.2, in an example approximately 2. In an embodiment, the intermediary bearing 375 provides additional support for the stator assembly 310 relative to the rotor shaft 370 to account for the small ratio of the inner diameter of the stator lamination stack 312 to the outer diameter of the rotor shaft 370. In addition, in the event the stator mount 314 becomes disengaged from the motor housing 302, the intermediary bearing 375 can still support the stator assembly 310.

In an embodiment, the motor assembly 300 to be utilized for high torque applications exceeding 220 N.m., preferably exceeding 240 N.m., even more preferably exceeding 255 N.m.

In an embodiment, cylindrical portion 322 is sized to extend more than half the length of the stator core 312, preferably more than 75% of the length of the stator core 312, and even more preferably approximately 80% to 90% of the length of the stator core 312. This allows the intermediary 376 to be disposed at the front end of the stator assembly 310 close to, or in contact with, the front end of the cylindrical portion 322 of the stator mount 314.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A brushless direct-current (BLDC) motor comprising:
a rotor shaft on which a rear motor bearing and a front motor bearing are mounted;
a motor housing through which the rotor shaft extends and including a substantially cylindrical body having an open end and a radial wall opposite the open end, the radial wall forming a first bearing pocket arranged to receive the front motor bearing therein;
a stator assembly including a stator core having an aperture extending therethrough, a plurality of stator teeth radially extending outwardly from the stator core and defining a plurality of slots therebetween, and a plurality of stator windings wound around the plurality of stator teeth;
a stator mount including a radial member coupled to the open end of the motor housing, an elongated cylindrical member projecting axially from the radial member into the aperture of the stator core, a hollow portion extending through a length of the elongated cylindrical member through which the rotor shaft extends, and a second bearing pocket formed in the radial member supporting the rear motor bearing;
an outer rotor comprising a cylindrical rotor core supporting at least one permanent magnet around an outer surface of the stator core;
a rotor mount including an outer rim arranged to couple to the outer rotor, a radial wall extending inwardly from the outer rim, and an inner body mounted on the rotor shaft; and
a positional sensor board mounted on the stator assembly adjacent the stator mount, the positional sensor board comprising at least one magnetic sensor positioned to magnetically sense the at least one permanent magnet of the rotor,
wherein the elongated cylindrical member of the stator mount includes a stepped portion between the stator core and the second bearing pocket, and the positional sensor board is radially aligned with the stepped portion.

2. The BLDC motor of claim 1, wherein the radial wall of the motor housing includes an opening coaxially aligned with first bearing pocket through which the rotor shaft extends out of the motor housing.

3. The BLDC motor of claim 1, wherein the second bearing pocket includes a recess having an open end facing away from the hollow portion.

4. The BLDC motor of claim 3, further comprising an enclosure projecting around the recess from the radial member.

5. The BLDC motor of claim 1, wherein the inner body of the rotor mount includes a first side provided adjacent the front motor bearing and a second side adjacent a radial plane formed by front ends of the stator windings.

6. The BLDC motor of claim 1, wherein the positional sensor board is mounted on an end insulator of the stator assembly, wherein a portion of the stator assembly supporting the positional sensor board is radially outward of the stepped portion.

7. The BLDC motor of claim 1, further comprising a plurality of signal sires coupled to the positional sensor board and received through an opening of the stator mount.

8. The BLDC motor of claim 1, wherein a ratio of a diameter of the aperture of the stator core to a diameter of the rotor shaft is at less than or equal to 1.2.

9. The BLDC motor of claim 1, further comprising an intermediate bearing received at least partially within the aperture of the stator core to radially support the stator core relative to the rotor shaft, wherein the elongated cylindrical member of the stator mount extends through more than approximately 80% of a length of the aperture of the stator core and the intermediate bearing is disposed on a front end of the aperture adjacent the elongated cylindrical member of the stator mount.

10. A power tool comprising a housing including a main body housing an output spindle and a handle portion, a battery receptacle configured to receive a removable battery pack, and a brushless direct-current (BLDC) motor housed within the handle portion, the BLDC motor comprising:
a rotor shaft on which a rear motor bearing and a front motor bearing are mounted;
a motor housing through which the rotor shaft extends and including a substantially cylindrical body having an open end and a radial wall opposite the open end, the radial wall forming a first bearing pocket arranged to receive the front motor bearing therein;
a stator assembly including a stator core having an aperture extending therethrough, a plurality of stator teeth radially extending outwardly from the stator core and defining a plurality of slots therebetween, and a plurality of stator windings wound around the plurality of stator teeth;

a stator mount including a radial member coupled to the open end of the motor housing, an elongated cylindrical member projecting axially from the radial member into the aperture of the stator core, a hollow portion extending through a length of the elongated cylindrical member through which the rotor shaft extends, and a second bearing pocket formed in the radial member supporting the rear motor bearing;

an outer rotor comprising a cylindrical rotor core supporting at least one permanent magnet around an outer surface of the stator core; and a rotor mount including an outer rim arranged to couple to the outer rotor, a radial wall extending inwardly from the outer rim, and an inner body mounted on the rotor shaft; and an intermediate bearing received at least partially within the aperture of the stator core to radially support the stator core relative to the rotor shaft, wherein the motor produces a maximum power output of at least 340 watts and the power tool has a power-to-weight ratio of at least 200 watts per pounds when powered by a battery pack having a rated capacity of 2 Ampere-hours, and wherein a diameter of the handle portion is less than or equal to 34 mm.

11. The power tool of claim 10, wherein the removable battery pack outputs a maximum rated voltage of approximately 20 volts, and wherein the motor produces a maximum power output of at least 450 watts and the power tool has a power-to-weight ratio of at least 280 watts per pounds.

12. The power tool of claim 10, wherein the removable battery pack outputs a maximum rated voltage of approximately 12 volts.

13. The power tool of claim 10, wherein the main body supports a tool holder opposite the handle portion, and wherein a length of the tool from a front portion of the tool holder to a rear portion of the battery receptacle is less than or equal to 250 mm and the power tool produces a maximum power output of at least approximately 450 watts and a maximum speed of at least approximately 25,000 rotations-per-minute.

* * * * *